United States Patent [15] 3,658,352
Koch et al. [45] Apr. 25, 1972

[54] QUICK CHANGE TOOL HOLDERS FOR AUTOMATIC TOOL CHANGERS

[72] Inventors: Roland G. Koch; John L. King, Jr., both of Frankenmuth, Mich.

[73] Assignee: Houdaille Industries, Inc., Buffalo, N.Y.

[22] Filed: July 29, 1970

[21] Appl. No.: 59,165

[52] U.S. Cl. .............................................. 279/89, 279/1 B
[51] Int. Cl. .................................................... B23b 31/16
[58] Field of Search ....................................... 279/1 B, 89, 90

[56] References Cited

UNITED STATES PATENTS 2,990,189   6/1961   Beers ..................................... 279/1 B
3,396,981   8/1968   Hammond .............................. 279/89
3,498,624   3/1970   Hammond et al ..................... 279/89 X Primary Examiner—Andrew R. Juhasz
Assistant Examiner—Z. R. Bilinsky
Attorney—Hill, Sherman, Meroni, Gross & Simpson

[57] ABSTRACT

A supporting body adapted to be mounted corotatively with a machine tool drive head or spindle has an axial bore releasably receptive of a tool adaptor shank which has an annular groove, the body having a lateral pin bore opening into the axial bore in alignment with the position occupied by the adaptor shank groove and a locking pin being reciprocably mounted in the pin bore for movement between a retracted release position and a locking position partially projecting into the axial bore and into the annular groove. The body has a longitudinally extending plunger bore intercepting the pin bore with a locking plunger reciprocably mounted in the plunger bore and means normally biasing the plunger to lock the pin in the locking position, with a relatively shiftable member carried by the body and operable in opposition to the biasing means to release the plunger from the pin to enable retraction of the pin to the release position. The shiftable member may be a cam carried rotatably on the body or it may be an axially movable trip ring. Means are associated with either the cam member or the plunger for positively ejecting the adaptor shank when the locking pin is released.

15 Claims, 7 Drawing Figures

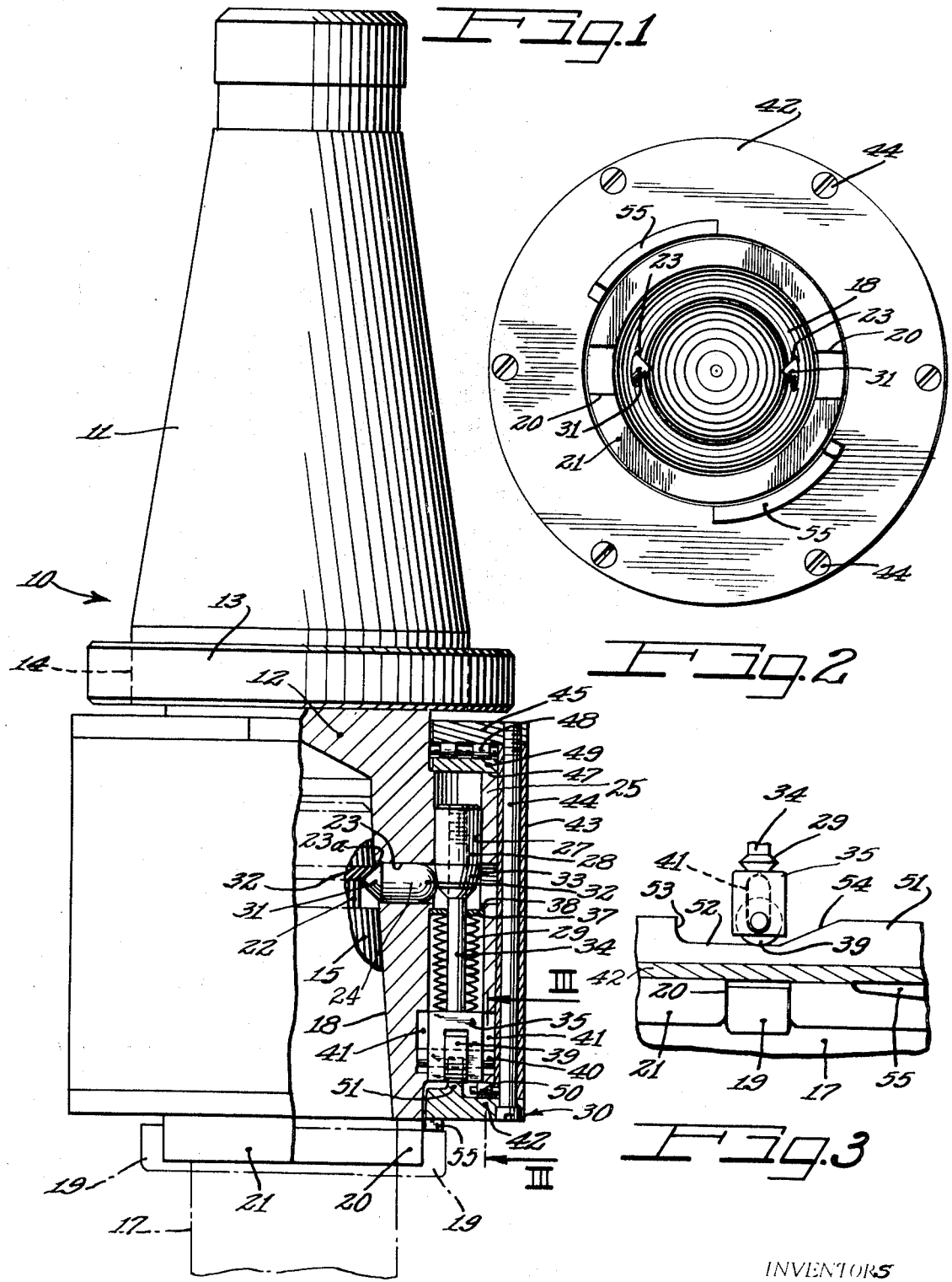

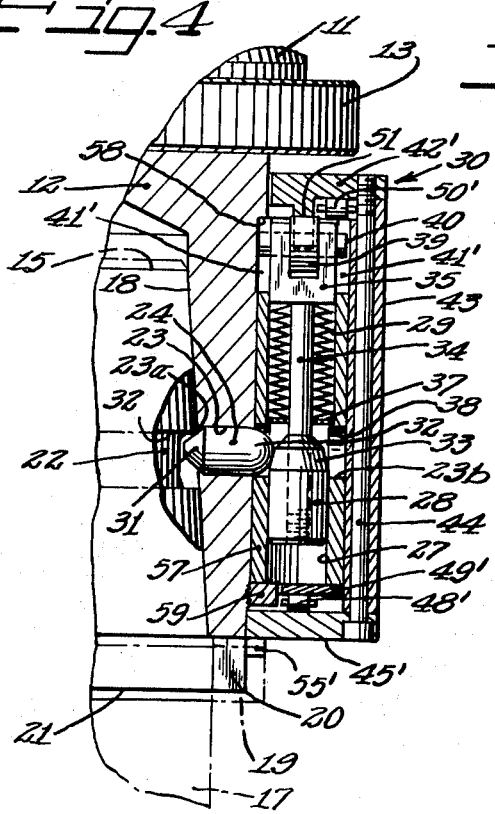
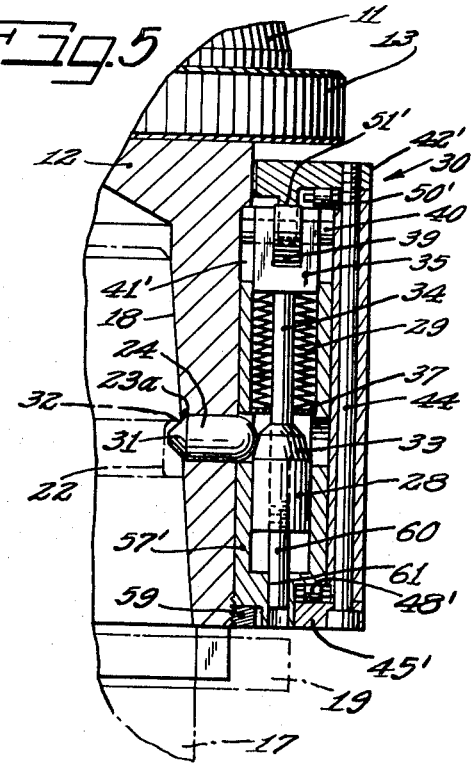
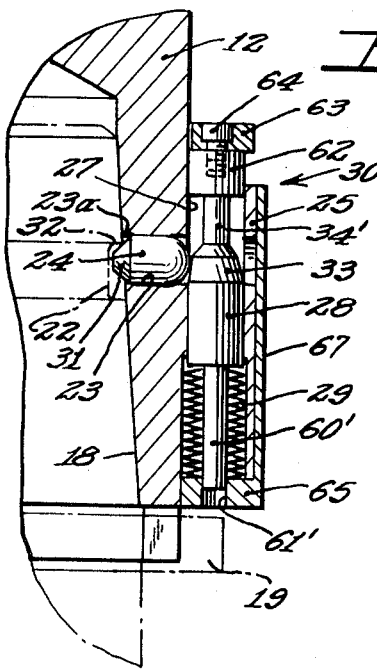
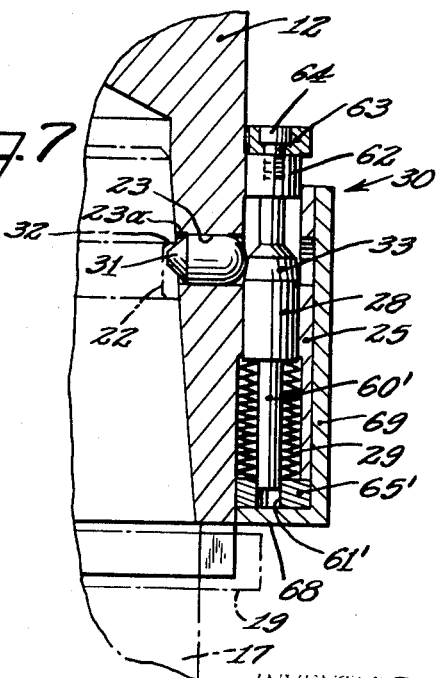

QUICK CHANGE TOOL HOLDERS FOR AUTOMATIC TOOL CHANGERS

This invention relates to quick change tool holders, and is more particularly concerned with such holders especially adapted for tooling systems involving automatic tool changers in machine tools.

In automatic machine tools quick changes must be made from one type or size of cutting or metal working tool to another size or type of tool for progressive machining operations.

While the threaded locking ring arrangement as disclosed, for example, in U.S. Pat. No. 2,719,722 has prooved to be quite successful, a more rapidly functioning locking and release arrangement has been desirable in view of more advanced technology in automatic metal working machines equipped with automatic tool-changing equipment. It is to this end that the present invention is directed.

An important object of the present invention is to provide a new and improved quick change tool holder mechanism which is especially suitable for use with high-speed automatic tool-changing equipment.

Another object of the invention is to provide new and improved quick change tool holders comprising few and simple, rugged, efficiently operating parts.

Another object of the invention is to provide a new and improved quick change tool holder in which a tool adaptor shank is adapted to be positively locked in the holder and arranged to be released and ejected by relative movement of a releasing mechanism carried by the holder.

A further object of the invention is to provide a quick-change tool holder which not only has means to insure positive driving of the tool but affords rigidity and concentricity consistent with precision machine tool use, and permits changing from one tool to another rapidly, simply and efficiently.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a side elevational view, partially in vertical section, showing a tool holder embodying features of the invention.

FIG. 2 is a lower end view of the holder.

FIG. 3 is an illustrative view illustrating the release cam structure taken substantially along the line III—III of FIG. 1; and FIGS. 4,5,6 and 7 are fragmentary vertical sectional detail views showing respective modifications.

By way of example, the invention has been illustrated as applied to a holder 10 of the type adapted for use in milling machines, boring mills, turret lathes and similar metalworking machines wherein progressive machining operations on a single workpiece or a succession of workpieces must be effected. In the course of operations on the workpiece, different types of metal working or cutting tools may be and generally are required. Pursuant to the present invention, the holder 10 is constructed and arranged to effect quick tool changes.

In a preferred construction, the holder 10 includes a tapered shank 11 desirably integral at its widest end with a body 12 and equipped about the area of juncture with the body with an annular flange 13 which may have one or more radially opening notches 14 useful in cooperation with means to maintain the holder corotative with a driving spindle or machine head in which the shank 11 is received.

For replaceably receiving a shank 15 of a tool adaptor 17, the body 12 is provided with an axial bore 18 which is desirably tapered toward its open end, which is remote from the flange 13. Corotation of the adaptor 17 with the body 12 is assured by engagement of one or more, and preferably two diametrically opposite ears or lugs 19 on the adaptor body within complementary interlock notches 20 opening radially and axially through an annular axially outwardly extending flange 21 on the body 12 about the mouth of the bore 18.

To enable retention of the tool adaptor 17 against unintentional axial displacement from the assembled relationship thereof with the holder 10 by engagement of the shank 15 within the bore 18, the adaptor shank 15 is provided with a peripheral interlock recess 22, which may be in the form of an annular grove, within which releasable interlock means of the holder are engageable. Generically, in all embodiments of the invention, the body 12 has a lateral pin bore 23 opening at a radially inner end into the axial bore 18 in alignment with the position occupied by the adaptor shank groove 22. A locking pin 24 is reciprocably mounted in the pin bore for movement between a retracted release position and a locking position partially projecting into the axial bore and into the annular groove 22. A body portion 25 which is at least functionally integral with the body 12 has a longitudinally extending plunger bore 27 in intersecting relation to the pin bore 23 so spaced from the inner end of the pin bore as to receive a radially outer end portion of the pin in the retracted release position. A locking plunger 28 is reciprocally mounted in the plunger bore 27 and has associated therewith means 29 normally biasing the plunger to act on the outer end of the pin 24 and lock the pin in the adaptor shank locking position. Relatively shiftable means 30 are carried by the body 12 and are operable on the plunger 28 in opposition to the biasing means 29 to release the plunger from the locking relation to the pin 24 to enable retraction of the pin to the release position.

Not only does the pin 24 function to lock the adaptor shank 15 releasably in the bore 18, but it also serves to draw the adaptor shank firmly axially inwardly into engagement with the wall of the bore 18 so that the adaptor will be maintained positively concentric with the holder 10 against any side play or looseness. This is accomplished by having the inner end portion of the pin 24 in the form of a conical nose 31 adapted to cam against an axially inner edge 32 defining the recess 22, the relationship of the pin bore 23 to the recess 22 being such that the pin bore is offset axially inwardly slightly relative to the recess 22 to assure an axially inward camming coaction of the nose 31 with the edge 32. In order to drive the pin 24 radially inwardly with adequate thrust to assure not only the interlocking cooperation of the pin with the adaptor shank, but also to effect the camming coaction therewith just described, the radially outer end portion of the pin is desirably provided with a semispherical tail surface 32 which normally projects at least slightly into the plunger bore 27 even in the adaptor shank locking position of the pin. Thereby a tapered cam surface 33, desirably of frusto-conical form, on a drive end portion of the plunger 28 thrustingly engaging with the semispherical or ball end 32 self-adjustably drives the pin 24 into the adaptor shank locking position. In the absence of the adaptor shank 15 within the bore 18, axially inward dropping of the pin 24 from the bore 23 is prevented by a stop constriction 23a at the inner end of the bore 23.

Up to this point, the description has been common to the mechanisms of all embodiments of the invention. Each embodiment will now be more particularly described.

In the form of the invention shown in FIGS. 1–3, biasing of the plunger 28 by the spring means 29 is effected through an axial reduced diameter stem 34 extending from the driving end portion of the plunger and which may be separately formed from the plunger and threaded thereinto for convenience in manufacture. On its opposite end, the stem 34 has a head 35 providing a shoulder against which the spring 29 thrusts at one end, while the opposite end of the spring is seated against a reaction surface or shoulder 37 rigid with the holder body 12 and desirably provided by a washer seated against an axially outward shoulder 38 in the plunger bore axially outwardly adjacent to the intersecting pin bore 23. In a desirable form, the spring 29 comprises a suitable stack of dished washer spring elements through which the stem 34 extends. Through this arrangement the spring 29 normally biases the plunger 28 in pin locking direction.

Cooperation of the relatively shiftable plunger releasing means 30 with the plunger is effected by having the shoulder head 35 slotted to provide an axially outwardly opening bifurcation accommodating a roller 39 rotatably mounted on an axle pin 40 having its opposite ends projecting beyond the head 35 to engage in respective vertical guide slots 41 in the adjacent portion of the body 12 whereby to maintain the roller 39 in proper running orientation with respect to an annular cam member 42 encompassing the axially outer end portion of the body 12 adjacent to but axially inwardly from the flange 21 and providing a principal component of the shiftable means 30. Mounting of the cam ring 42 relatively rotatably on the body 12 is through the medium of a tubular housing or sleeve 43 encompassing the body 12 and secured as by means of screws 44 to and between the ring 42 at one end and a retaining end plate 45 at its opposite end overlying an annular retaining shoulder 47 on the body 12 spaced from the flange 13. For antifriction support of the end plate 45 bearing means 48 are interposed between the shoulder 47 and the plate and running on a bearing race ring 49 closing over the end of the plunger bore 27. To facilitate assembly of the plate 45 and the ring 49 on the shoulder 47, these elements are desirably constructed of complementary two-part split portions. To further enhance anti-friction running of the plunger releasing assembly on the body 12, bearing means 50 may be carried between the cam ring 42 and the adjacent end of the body.

Cam means on the ring 42 are constructed and arranged to enable the plunger 28 to assume freely the pin locking relationship in one relative tortional position of the sleeve 43 and the body 12 while in another relative torsional position shifting the plunger 28 in opposition to the biasing spring 29 to release the plunger from the locking relation to the pin. To this end, the cam ring 42 has thereon an annular axially inwardly extending cam flange 51 with which the follower or cam roller 39 is aligned. When the cam roller is received in a release area 52 recessed in the cam flange 51, the plunger 28 is free to lock the pin 24. To retain the plunger releasing assembly 30 normally corotative with the body 12, a stop shoulder 53 is provided at the end of the release recess 52 toward which the roller 39 is normally carried in the rotation of the body 12. When it is desired to release the plunger 28 from its pin-locking relation, relative rotary movement of the sleeve 43 and the body 12 is effected, as for example by holding the sleeve 43 stationary while the body 12 continues to rotate, at least for a short interval of time, whereby the follower roller 39 will ride a lift-out oblique cam surface 54 at the opposite end of the release recess 52 to cause the roller to ride onto the ridge of the cam flange 51, wherein the plunger will be held against the bias of the spring 29 in the fully pin-releasing relation, which will be maintained until by relative rotary movement of the body 12 and the sleeve 43 the follower roller 39 and the head 35 again drop into the release recess 52.

As soon as the locking plunger 28 has been backed off to release the locking pin 24, the pin is adapted to be cammed radially outwardly by the edge 32 of the adaptor shank 15 whereupon the adaptor may drop away or be carried away from the holder pin. In order to assure ejection of the adaptor promptly after release of the pin 24, an ejector cam 55 on the axially outer end of the cam ring 42 rides against the adjacent ear lug 19 of the adaptor 17 and drives it axially away from the holder body. For proper timing, the starting end of the ejector cam 55 is located in such relation to the cam surface 54 as to assure that the plunger will have been completely shifted to the pin unlocking or release position before ejection contact with the ear lug 19. Further, in order to prepare the assembly promptly for accepting another tool adaptor, the ejector cam 55 comprises a relatively short segment, freeing the axial outer end of the cam ring 42 throughout its major extent for receiving the ear lug 19 in relatively close relation thereto. Through this arrangement, release and ejection of the adaptor from the holder can be effected in about 90° relative rotary movement of the body 12 and the sleeve 43, with cessation of the relative rotary motion then leaving the holder open in readiness to receive the next adaptor. After insertion of the adaptor into the holder, a brief resumption of rotary motion brings the release recess 52 again into alignment with the roller 39 and its attached parts, permitting the spring 29 to urge the plunger 28 into operating locking cooperation with the pin 24 to thoroughly seat and lock the adaptor in the holder.

Although only one cooperating pin and plunger assembly has been described, and for some purposes one such assembly may be sufficient, the holder 10 is shown as having a pair of such assemblies at diametrically opposite sides, with operation of the assemblies perfectly synchronized throughout.

Referring to FIG. 4, the modification there depicted is much the same as the form of FIG. 1 and the rotary operation for unlocking and ejection of one adaptor and reception and locking of the next adaptor is the same as described for FIG. 1. In FIG. 4, however, the plunger bore 27 is in a portion of the body 12 constructed as a separate piece and assembled fixedly and functionally integral therewith, comprising an annular attachment 57 secured in place about the main portion of the body 12 by being thrust fixedly against a shoulder 58 by means of a ring nut 59. A pin bore extension $23^b$ in the body portion 57 is aligned with the pin bore 23 in the main body portion. In this instance, the plunger 28 is reversed relative to the disposition in FIG. 1, with the cam ring 42' adjacently spaced from the flange 13 and the plate 45' constructed in one piece and secured to the opposite end of the sleeve 43 with the bearing 48' riding between the ring 45' and the race ring 49' which is dimensioned to clear the nut 59. In this instance, the end plate 45' has thereon the ejector cam 55'. In this instance, the guide slots 41' are in the portion 57, and the bearing 50' rides on the adjacent end of the portion 57.

In FIG. 5, the modification is substantially identical with FIG. 4 except that instead of the ejector cam structure, an ejector plunger 60 is provided which is secured to and projects axially from the head end of the plunger 28 through a clearance bore 61 in the axially outer end of the body portion 57' in line with the ear lug 19. For this purpose, the lugs 19 may be extended further axially outwardly than is practicable with the arrangement utilizing the ejector cam 55 or 55'. In FIG. 5, moreover, it is desirable to have a slight modification of the cam 51' so that it will have three levels or stages, in which the first is that shown wherein the plunger 28 is in its pin locking position, similarly as previously described. The second level of the cam 51' is sufficiently higher in an axially outward direction to cause retraction of the plunger 28 from the pin 24, for unlocking it. The third level of the cam 51' is still further extended in the axially outward direction to cause further retraction of the plunger 28 so as to project the ejector pin 60 against the ear lug 19 to eject the adaptor. In the relative rotary motion between the sleeve 43 and the holder body, the roller 39 will progress from the first to the second level of the cam 51' to unlock the pin and then moves on to the third level to eject the adaptor, then riding to a point approximately at the second level at which point a cessation of rotary motion will hold the holder open in readiness to receive the next adaptor. After insertion of the next adaptor, a brief resumption of rotary motion progresses the roller from the second level of the cam to the first level or plunger locking position under the influence of the biasing spring 29.

For use in a tool changer system equipped with means for actuating the plunger releasing means 30 by axial thrust rather than relative rotary action, the modification of FIG. 6 is provided. In this arrangement, the body portion 25 is adapted to be integral with the main body portion similarly as in FIG. 1, but the pin locking plunger 28 is in the reversed relationship of FIGS. 4 and 5. Modification of the shiftable plunger releasing means for reciprocable rather than rotary acuation relative to the body 12 comprises supplying the end of the stem 34' remote from the plunger 28 with an attachment head 62 reciprocable in and normally projecting a substantial distance out of the axially inner or upper end of the plunger bore 27. Although the head 62 may be directly engaged by a depressor for shifting the plunger 28 in opposition to the bias of the spring 29, a thrust ring 63 encircling the body 12 is secured to the head 62 as by means of a screw 64. An axial force acting upon the ring 63 drives it axially inwardly or downwardly in opposition to the bias of the spring 29 which in this instance thrusts against the head end of the plunger 28 and seats against a retaining flange 65 extending across the mouth or the outer end of the bore 27 and integral with a sleeve 67 which fixedly embraces the body portion 25 in closing relation to the radially outer end of the pin bore 23. For adaptor ejection, the pin extension 60' moving through the clearance bore 61' functions similarly as the pin extension 60 in FIG. 5 to engage the ear lug 19 for adaptor ejection. In operation, the axial force acting upon the ring 63 first urges the plunger 28 from its locking relation to the pin 24 to unlock the adaptor. COntinued axial travel then urges the extension 60' into contact with the ear lug 19 to eject the adaptor. A retraction of the axial thrust on the ring 63 to an intermediate position then leaves the holder open and ready to receive the next adaptor. After insertion of the next adaptor, retraction of the axial thrust is completed to bring the plunger 28 into locking cooperation with the pin 24 to lock the replacement adaptor in position.

In the modification of FIG. 7, construction and operation are substantially the same as described for FIG. 6 except that the spring retaining flange 65' is a ring attached fixedly to the axially outer end of the body portion 25 with an ejector flange 68 intervening between the outer end of the clearance bore 61' and the lug ear 19.

This accommodates a shorter ear lug 19 than either of the arrangements in FIG. 5 and 6. Conveniently, the ejector flange 68 is integral with a housing sleeve 69 reciprocably frictionally slidable on and about the body portion 25. Through this arrangement, adaptor ejection is accomplished by the plunger extension 60' thrusting the flange 68 toward and against the ear lug 19. Similarly as in respect to the arrangements of FIGS. 5 and 6, a lost motion in travel of the ejector end of the extension 61' enables movement of the plunger 28 to unlocking position before the extension 60' travels to the adaptor ejection position, the extension 60' being then returned through the lost motion of its travel to the ready position for reception of a replacement adaptor in the holder.

It will be understood that variations and modifications may be effected without departing from the spirit and scope of the novel concepts of this invention.

We claim:

1. A quick change tool holder, comprising:
a supporting body adapted to be mounted corotatively with a machine tool drive head or spindle and having an axial bore releasably receptive of a tool adaptor shank which has a peripheral interlock recess;
said body having a lateral pin bore opening at a radially inner end into said axial bore in alignment with the position occupied by the adaptor shank recess;
a locking pin reciprocally mounted in said pin bore for movement between a retracted release position and a locking position partially projecting into said axial bore and into said recess;
a body portion which is at least functionally integral with said body having a longitudinally extending plunger bore in intersecting relation to said pin bore so spaced from said inner end as to receive a radially outer end portion of said pin in said retracted release position;
a locking plunger reciprocally mounted in said plunger bore;
means normally biasing said plunger to act on said outer end and lock said pin in said locking position; and
relatively shiftable means carried by said body and operable on said plunger in opposition to said biasing means to release said plunger from the locking relation to said pin to enable retraction of the pin to said release position.

2. A holder according to claim 1, said locking pin having a conical locking tip which is projectable into the axial bore to engage against an edge of the adaptor shank recess for imparting an axial thrust thereto inwardly relative to said axial bore.

3. A holder according to claim 1, the radially outer end portion of said pin comprising a ball end tail surface and said plunger having a tapered cam surface engageable with said tail surface for adjustably driving said pin radially inwardly under the force of said biasing means.

4. A holder according to claim 1, in which said biasing means comprise a strong load multi-cupped disk stack compression spring.

5. A holder according to claim 1, in which said shiftable releasing means comprises a rotary cam and said plunger has a follower riding said cam.

6. A holder according to claim 5, said cam comprising a ring, and a housing sleeve encompassing said body and relatively rotatably movable thereon for operating said cam.

7. A holder according to claim 5, including corotational interlock means on said body adjacent the outer end of said axial bore for radially extending ear lug means on the adaptor, said rotary cam comprising a ring located adjacent to said interlock means and having an ejector cam structure thereon engageable with the ear lug means for positively ejecting the adaptor after the plunger has been released from the pin by operation of said cam in the rotation of said ring.

8. A holder according to claim 1, said relatively shiftable releasing means comprising a housing sleeve relatively rotatably mounted on and about said body and carrying a plunger actuating cam, and said plunger having a follower operatively engaged by the cam.

9. A holder according to claim 8, said cam being mounted on one end portion of said rotary housing sleeve and including additional cam structure engageable with a structure connected with the tool adaptor shanks for positively ejecting the adaptor shank from said axial bore.

10. A holder according to claim 8, said cam being on one end portion of said housing sleeve, and the opposite end portion of the housing sleeve having cam means thereon cooperable with a part connected with said tool adaptor shank for positively ejecting the shank after the plunger has been moved into pin releasing relation.

11. A holder according to claim 8, including a plunger extension operable through actuation of the plunger by said cam to act upon a structure associated with the tool adaptor shank for positively ejecting the shank from said axial bore after the pin has been released therefrom.

12. A holder according to claim 1, including an extension on said plunger operable to engage a structure associated with said tool adaptor shank after the pin has been released to positively eject the shank from said axial bore.

13. A holder according to claim 1, including an adaptor ejection device, and means on said plunger acting to operate said ejector device after the plunger has been released from said pin.

14. A holder according to claim 1, in which said shiftable releasing means comprise an axially operable member connected to said plunger.

15. A holder according to claim 13, in which said axially operable member comprises a thrust ring connected to said plunger.

* * * * *